(12) United States Patent
Kayama

(10) Patent No.: US 9,268,515 B2
(45) Date of Patent: Feb. 23, 2016

(54) INFORMATION PROCESSING APPARATUS, INFORMATION PROCESSING SYSTEM, AND INFORMATION PROCESSING METHOD, FOR TRANSMITTING PRINT JOBS TO A PRINTING CONTROL APPARATUS

(71) Applicant: CANON KABUSHIKI KAISHA, Tokyo (JP)

(72) Inventor: Hiroyuki Kayama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/166,132

(22) Filed: Jan. 28, 2014

(65) Prior Publication Data

US 2014/0218756 A1   Aug. 7, 2014

(30) Foreign Application Priority Data

Feb. 1, 2013 (JP) ................................. 2013-018597

(51) Int. Cl.
*G06K 15/00* (2006.01)
*G06F 3/12* (2006.01)

(52) U.S. Cl.
CPC .............. *G06F 3/126* (2013.01); *G06F 3/1208* (2013.01); *G06F 3/1211* (2013.01); *G06F 3/1232* (2013.01); *G06F 3/1285* (2013.01)

(58) Field of Classification Search
CPC ........... G06F 15/00; G06F 3/12; G06F 15/02; G06F 3/1216; G06F 3/1296
See application file for complete search history.

(56) References Cited

U.S. PATENT DOCUMENTS

| | | | | |
|---|---|---|---|---|
| 6,917,437 B1* | 7/2005 | Myers | ................... | G06F 3/1207 358/1.13 |
| 2003/0011816 A1* | 1/2003 | Ikeno | ..................... | G06K 15/00 358/1.15 |
| 2005/0128512 A1* | 6/2005 | Kurotsu | ............. | H04N 1/00278 358/1.15 |
| 2012/0086974 A1* | 4/2012 | Kiuchi | ............... | G06K 15/1802 358/1.15 |
| 2013/0258389 A1* | 10/2013 | Omura | .................. | G06F 3/1297 358/1.14 |

FOREIGN PATENT DOCUMENTS

JP   P2012-083921 A   4/2012

* cited by examiner

*Primary Examiner* — Barbara Reinier
*Assistant Examiner* — Henok A Shiferaw
(74) *Attorney, Agent, or Firm* — Canon U.S.A., Inc. IP Division

(57) ABSTRACT

An information processing apparatus, in a case where determination whether resource data can be added and registered in a printing control apparatus is made, and if it is determined that the resource data cannot be added and registered, without transmitting a resource registration job, performs control so that the print job is transmitted to the printing control apparatus, and when the print job arrives at the top of a print queue, performs control so that the resource registration job is transmitted, and after registration of the resource data, performs control so that output of the print job being stopped in the printing control apparatus is started.

8 Claims, 15 Drawing Sheets

FIG.7A

701  JOB TICKET FILE

```
<Job>
  <Property name="JobName">
    <Value>MediaJob0001</Value>
  </Property>
  <Property name="JobType">
    <Value>MediaJob</Value>
  </Property>
  <Resources>
    <ContentFile fileNo="1">Http://xxxx/Media.xml</ContentFile>
  </Resources>
<Job>
```

702  RESOURCE FILE (Media.xml)

```
<MediaCatalog>
  <MediaParams>
    <MediaCode id="1001">
      <ValueParam name="MediaSize">
        <Value>Letter</Value>
      </ValueParam>
      <ValueParam name="MediaType">
        <cpf:Value>Plain</cpf:Value>
      </ValueParam>
    </MediaCode>
    <MediaCode id="1002">
      <ValueParam name="MediaSize">
        <Value>Letter</Value>
      </ValueParam>
      <ValueParam name="MediaType">
        <cpf:Value>Heavy</cpf:Value>
      </ValueParam>
    </MediaCode>
    <MediaCode id="1003">
      <ValueParam name="MediaSize">
        <Value>Legal</Value>
      </ValueParam>
      <ValueParam name="MediaType">
        <cpf:Value>UserDefinitionType</cpf:Value>
      </ValueParam>
      <ValueParam name="MediaName">
        <cpf:Value>Custom1</cpf:Value>
      </ValueParam>
      <ValueParam name="MediaWeight">
        <cpf:Value>130</cpf:Value>
      </ValueParam>
      <ValueParam name="MediaFinish">
        <cpf:Value>Uncoted</cpf:Value>
      </ValueParam>
      <ValueParam name="MediaColor">
        <cpf:Value>White</cpf:Value>
      </ValueParam>
    </MediaCode>
    ...
  </MediaParams>
</MediaCatalog>
```

FIG.8

| MEDIA CODE 801 | PAPER SIZE 802 | PAPER NAME 803 | GRAMMAGE 804 | SURFACE PROPERTY 805 | COLOR 806 |
|---|---|---|---|---|---|
| 1001 | Letter | Plain | 93 | HIGH-QUALITY PAPER | WHITE |
| 1002 | Letter | Heavy | 117 | HIGH-QUALITY PAPER | WHITE |
| 1003 | Legal | Custom1 | 130 | HIGH-QUALITY PAPER | WHITE |
| 1004 | 2300 × 2794 | Custom2 | 121 | Tab | BLUE |
| ... | ... | ... | ... | ... | ... |
| 1250 | Letter | Custom200 | 100 | HIGH-QUALITY PAPER | YELLOW |

```
<MediaType>
 <MediaTypeParams>
   <MediaTypeId id="1003">
     <ValueParam name="MediaName">
       <cpf:Value>Custom1</cpf:Value>
     </ValueParam>
     <ValueParam name="MediaWeight">
       <cpf:Value>130</cpf:Value>
     </ValueParam>
     <ValueParam name="MediaFinish">
       <cpf:Value>Uncoted</cpf:Value>
     </ValueParam
     <ValueParam name="MediaColor">
       <cpf:Value>White</cpf:Value>
     </ValueParam>
   </MediaTypeId>
   ...
 </MediaTypeParams>
</MediaType>
```

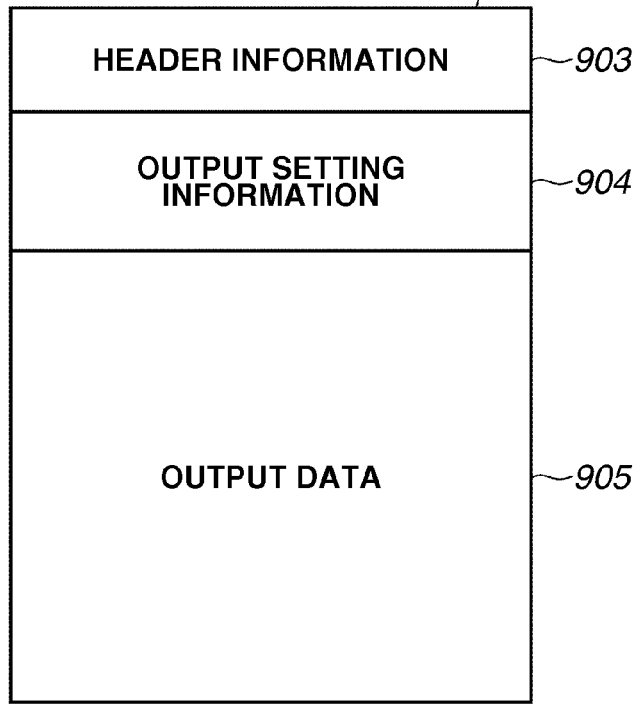

902

- 903 HEADER INFORMATION
- 904 OUTPUT SETTING INFORMATION
- 905 OUTPUT DATA

FIG.10

| JOB NAME | JOB ID | TYPE | MEDIA JOB | WAIT FLAG | SKIP |
|---|---|---|---|---|---|
| MediaJob0005 | 1005 | Media | — | ON | — |
| PrintJob0006 | 1006 | Print | 1005 | — | OFF |
| MediaJob0007 | 1007 | Media | — | ON | — |
| PrintJob0008 | 1008 | Print | 1007 | — | OFF |
| PrintJob0009 | 1009 | Print | 1007 | — | OFF |

| | 1102 | 1103 | 1104 | 1105 | 1106 |
|---|---|---|---|---|---|
| 1101 | | | | | |
| PRINTER | PAPER TYPE ID | PAPER NAME | GRAMMAGE | SURFACE PROPERTY | COLOR |
| PrinterA | 101 | Custom1 | 130 | HIGH-QUALITY PAPER | WHITE |
| PrinterA | 102 | Custom2 | 121 | Tab | BLUE |
| PrinterA | 103 | Custom3 | 120 | Tab | RED |
| ... | | | | | |
| PrinterA | 300 | Custom200 | 150 | HIGH-QUALITY PAPER | WHITE |

| | 1109 | 1110 | 1111 | 1112 |
|---|---|---|---|---|
| 1108 | | | | |
| PRINTER | JOB NAME | JOB ID | PRINTER JOB ID | STATUS |
| PrinterA | PrintJob1 | 1001 | 22001 | PRINTING |
| PrinterA | PrintJob2 | 1002 | 22002 | WAITING FOR PRINT |
| PrinterA | PrintJob3 | 1003 | 22003 | PROCESSING |
| PrinterA | PrintJob4 | 1004 | 22004 | WAITING FOR PROCESS |
| PrinterA | PrintJob5 | 1005 | 22005 | WAITING FOR PROCESS |

~1107

INFORMATION PROCESSING APPARATUS, INFORMATION PROCESSING SYSTEM, AND INFORMATION PROCESSING METHOD, FOR TRANSMITTING PRINT JOBS TO A PRINTING CONTROL APPARATUS

BACKGROUND

1. Field

The present subject matter relates to an information apparatus that transmits print jobs to a printing control apparatus.

2. Description of the Related Art

In known systems for performing printing of job data with a printing control apparatus, a system that registers a resource object (for example, parameters of output paper and image data) necessary for the printing of the job data in the printing apparatus in advance, and performs the printing has been implemented. In such a system, Japanese Laid-Open Patent Application No. 2012-083921 discusses a technique in which when no resource object exists in a printing control apparatus, job data is stored as a waiting job, and when the resource object is registered in the printing control apparatus, the printing of the waiting job is started.

In the above-described system, however, the timing for registering the resource object in the printing control apparatus is not considered. For example, even though the resource object has been registered in the printing control apparatus in advance, in starting the job data, the data may be deleted or overwritten. In such a case, a proper output result may not be obtained, or the user may have to wait for a long time until the execution of the printing. In other words, the resource data is not registered at appropriate timing to the printing control apparatus expected to output the print job using the resource data.

SUMMARY

According to an aspect of the present subject matter, an information processing apparatus connected to a printing control apparatus configured to sequentially output print jobs using resource data according to a print queue for controlling a print job output order, the information processing apparatus having a data transmission unit configured to send a resource registration job for registering a resource in the printing control apparatus and the print job to the printing control apparatus, includes a determination unit configured to determine whether the resource data can be added and registered in the printing control apparatus, and a control unit configured to, in a case where the determination unit has determined that the resource data cannot be added and registered in the printing control apparatus, without transmitting the resource registration job, control the data transmission unit to send the print job that requires the resource data for output in a stop state to the printing control apparatus, when the print job arrives at the top of the print queue, control the data transmission unit to send the resource registration job to the printing control apparatus, and after registration of the resource data based on the resource registration job, and control the printing control apparatus so as to start the output of the print job being stopped in the printing control apparatus.

Further features of the present subject matter will become apparent from the following description of exemplary embodiments with reference to the attached drawings.

BRIEF DESCRIPTION OF THE DRAWINGS

FIG. 8 illustrates a format of a resource data information list managed in the information processing system according to the present exemplary embodiment.

FIGS. 9A and 9B illustrate formats of job data for resource data registration and printing according to the present exemplary embodiment.

FIG. 10 illustrates a format of a job information list managed in the information processing system according to the present exemplary embodiment.

FIGS. 11A and 11B illustrate formats of a paper information list and a print job list stored in a printer 104 or a printer 105 managed in the information processing system according to the present exemplary embodiment.

DESCRIPTION OF THE EMBODIMENTS

Hereinafter, exemplary embodiments for implementing the present subject matter will be described with reference to the attached drawings.

<Example Configuration of Information Processing System>

Figure 1:
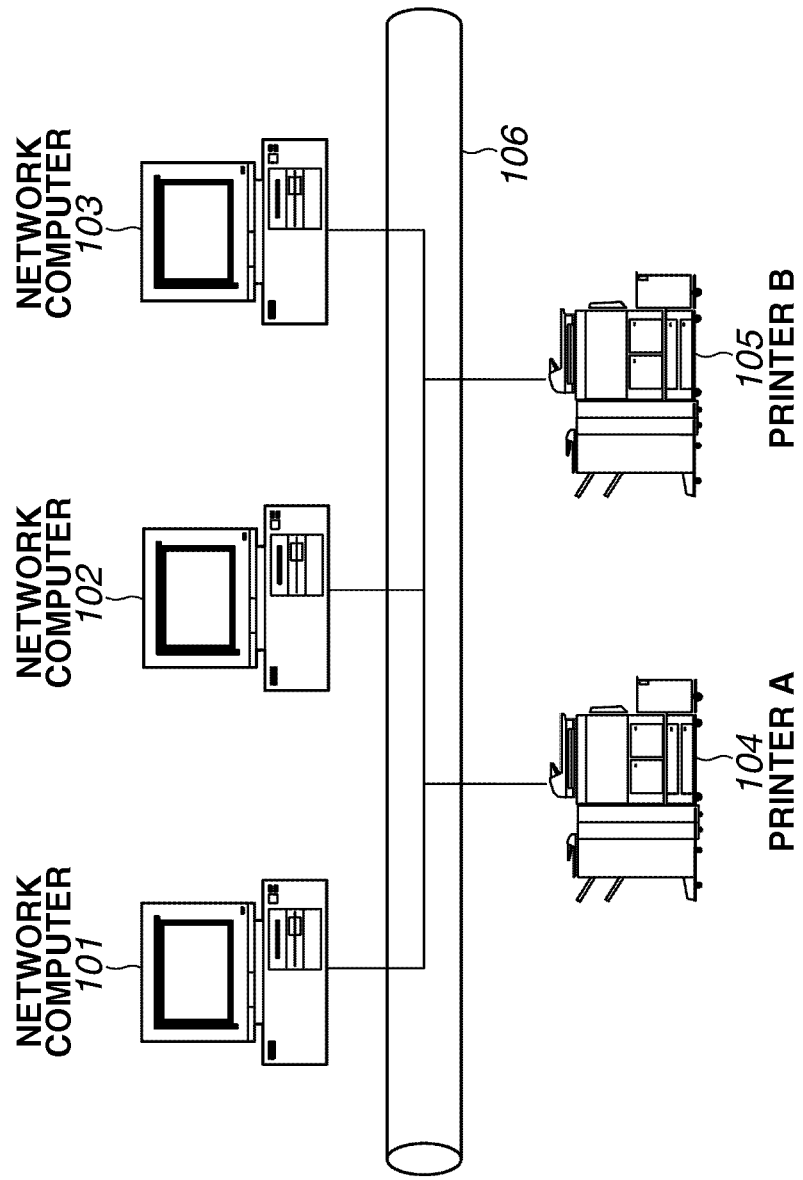
FIG. 1 is a system configuration diagram illustrating an information processing system according to an exemplary embodiment.

FIG. 1 illustrates an entire configuration of an information processing system according to an exemplary embodiment. The environment of the entire information processing system described below is provided to facilitate the understanding of the description of the present exemplary embodiment, and the present subject matter is not limited to the environment. In FIG. 1, network computers (hereinafter, simply referred to as computers) 101, 102, and 103 are capable of communicating with each other, and the computers are connected to a network 106. The computers are, typically, personal computers (PCs). Each of the computers is connected to the network 106 with a network cable such as Ethernet (registered trademark). The computers are capable of executing various programs such as application programs. The respective computers 101, 102, and 103 have a function for transferring job data and a resource object (resource data) generated in the computer 101, computer 102, and/or computer 103 to the network printer 104 and/or network printer 105. Further, the computers 101, 102, and 103 can acquire information of job data received and processed or stored by the network printer 104 and/or 105 via the network 106, and display and edit the information. Further, the computers 101, 102, and 103 can acquire resource data stored in the network printer 104 and/or 105 and display and edit the information. The network printers 104 and 105 (hereinafter, simply referred to as printers) serve as printing control apparatuses. The network printers 104 and 105 are connected to the network 106 via a network interface (not illustrated). The printers 104 and 105 can analyze job data including print data transmitted from the computer 101, computer 102, and/or computer 103, and convert the data into a dot image for each page to print the images. Further, the printers 104 and 105 can display job data received from the computers 101, 102, and/or 103 on a user interface of the printers 104 and/or printer 105, send the job data to the computers 101, 102, and/or 103 as an electronic mail, or the like, and send the job data to a facsimile apparatus (not illustrated) as a facsimile. Further, the network printers 104 and 105 can store resource data including paper information data received from the computers 101, 102, and/or 103, and use the data as parameters in printing the job data. Hereinafter, if it is necessary to distinguish the printers 104 and 105, the printers 104 and 105 are referred to as a printer A and printer B, respectively. The functions of the individual printers may be different. The network 106 is connected with the computers 101, 102, and 103, and the printers 104 and 105.

<Example Hardware Configuration of Network Computer>

Figure 2:
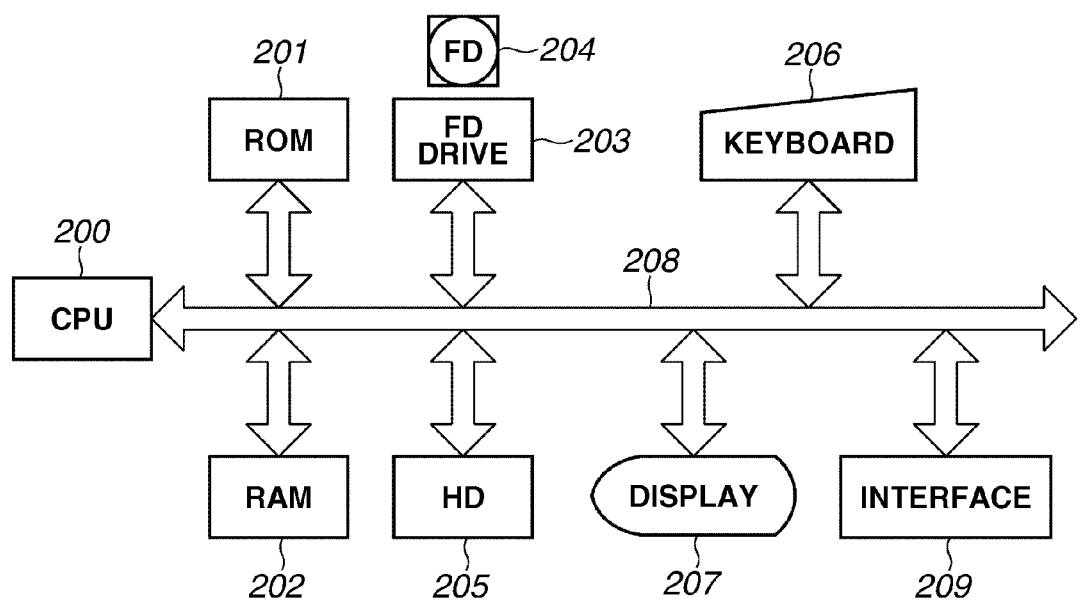
FIG. 2 is a block diagram illustrating a schematic configuration of a computer illustrated in FIG. 1.

FIG. 2 is a block diagram illustrating a configuration of the computers 101, 102, and 103.

Figure 5:
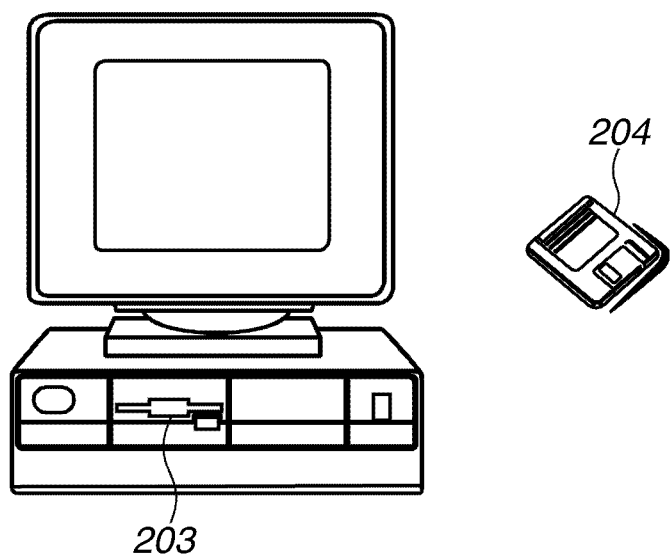
FIG. 5 illustrates a relationship between a FD drive and the FD to be inserted into the FD drive according to the present exemplary embodiment.

In FIG. 2, a central processing unit (CPU) 200 performs overall control of the apparatus. The CPU 200 executes, for example, application programs, printer driver programs, operating system (OS), and an information processing program according to the present exemplary embodiment stored in a hard disk (HD) 205, and performs control for temporarily storing information necessary for the execution of the programs and files in a RAM 202. A read-only memory (ROM) 201 serves as a storage unit. In the ROM 201, programs such as a basic I/O program, various kinds of data such as font data to be used in document processing, and data for templates are stored. The RAM 202 serves as a temporal storage unit, and functions as a main memory, a work area, or the like of the CPU 200. A floppy disk (FD) drive 203 serves as a storage medium reading unit. As illustrated in FIG. 5 (described below), a program stored in a FD 204 serving as a storage medium can be loaded into the computer, for example, via the FD drive 203. The FD 204 serves as a storage medium, and stores a program in a computer-readable manner. The storage medium is not limited to the FD, and alternatively, for example, a compact disc read-only memory (CD-ROM), a compact disc recordable (CD-R), a compact disk rewritable (CD-RW), a PC card, a digital versatile disc (DVD), an integrated circuit (IC) memory card, a magneto-optical (MO) disk, and a memory stick can be used. A hard disk (HD) 205 is an external storage unit that serves as a large-capacity memory. The HD 205 stores, for example, application programs, printer driver programs, an operating system, information processing programs, and related programs. A keyboard 206 serves as an instruction input unit. The keyboard 206 is used to input, for example, an instruction of a control command of a device to instruct a computer by a user. A display 207 serves as a display unit. The display 207 displays, for example, a command input via the keyboard 206, and a printer status. A system bus 208 controls the flow of data in the computer. An interface 209 serves as an input and output unit. Via the interface 209, the information processing apparatus exchanges data with an external device. The above-described configuration of the computer is an example, and the configuration is not limited to the configuration illustrated in FIG. 2.

For example, the storage destination of the data and programs can be changed to the ROM, RAM, or HD.

Figure 3:
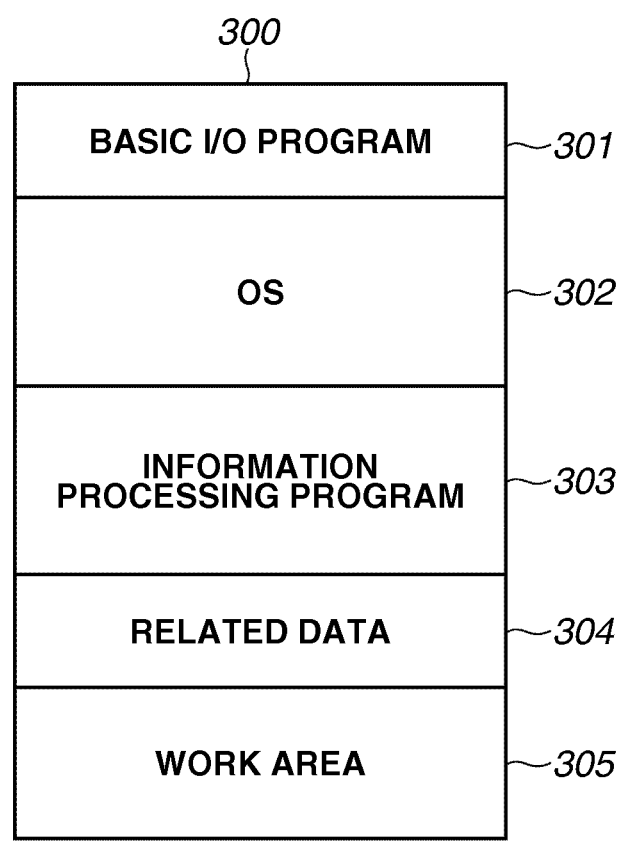
FIG. 3 is a memory map obtained by loading a program illustrated in FIG. 4 from a floppy disk (FD) to a random access memory (RAM) illustrated in FIG. 2.

FIG. 3 illustrates an example of a memory map in the RAM 202 illustrated in FIG. 2. As illustrated in FIG. 3, an information processing program for controlling the information processing system according to the present exemplary embodiment has been loaded from the FD 204 to the RAM 202, and the program is ready for execution. In the present exemplary embodiment, the information processing program and related data are directly loaded from the FD 204 to the RAM 202 and executed. Alternatively, every time the information processing program is operated, from the HD 205 in which the information processing program has already been installed from the FD 204, the program can be loaded to the RAM 202. The medium for storing the information processing program may be a CD-ROM, a CD-R, a PC card, a DVD, and an IC memory card other than the FD. Further, the information processing program can be stored in the ROM 201 in advance to serve as a part of the memory map, and the program can be directly executed by the CPU 200. Further, software implementing functions similar to those of the above-described devices can be used as an alternative to the hardware device. A basic I/O program 301 is a program area including an initial program loading (IPL) function for starting the operation of an OS when the power of the computer is turned on and the OS is read from the HD 205 to the RAM 205. An OS 302 and an information processing program 303 according to the present exemplary embodiment are stored in a region secured on the RAM 202. Related data 304 is stored in a region secured on the RAM 202. In a work area 305, a region for executing the information processing program by the CPU 200 is secured.

Figure 4:
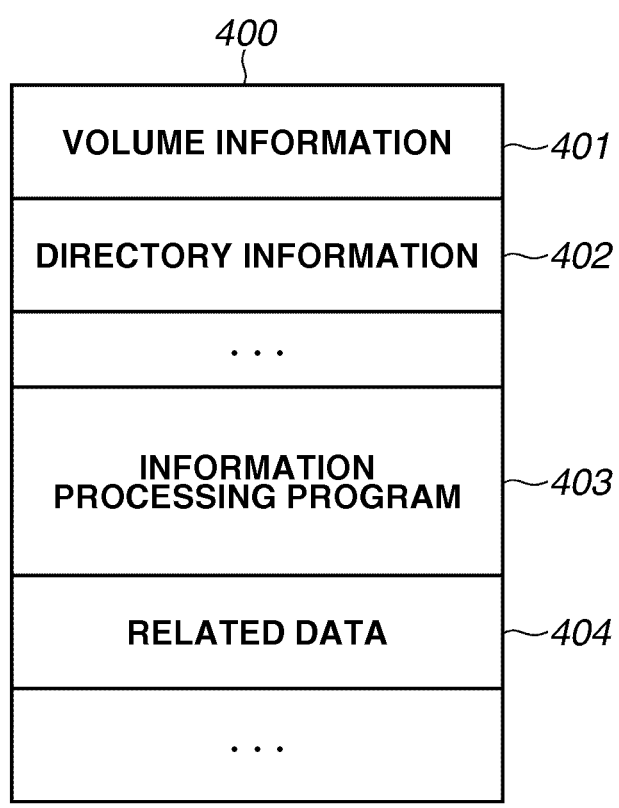
FIG. 4 is a memory map illustrating data in the FD illustrated in FIG. 2.

FIG. 4 illustrates an example of a memory map 400 in the FD 204 illustrated in FIG. 2.

Referring to FIG. 4, the memory map 400 includes volume information 401 indicating information of data, directory information 402, an information processing program 403, which will be described in the present exemplary embodiment, and data 404 relating to the program. The information processing program 403 is programmed according to a flowchart described in the present exemplary embodiment.

FIG. 5 illustrates a relationship between the FD drive 203 illustrated in FIG. 2 and the FD 204 to be inserted into the FD drive 203. In FIG. 5, the same reference numerals as in FIG. 2 are applied to components similar to those in FIG. 2. In FIG. 5, the FD 204 stores the information processing program and the related data to be described in the present exemplary embodiment.

<Software Configuration Example According to the Present Exemplary Embodiment>

Figure 6:
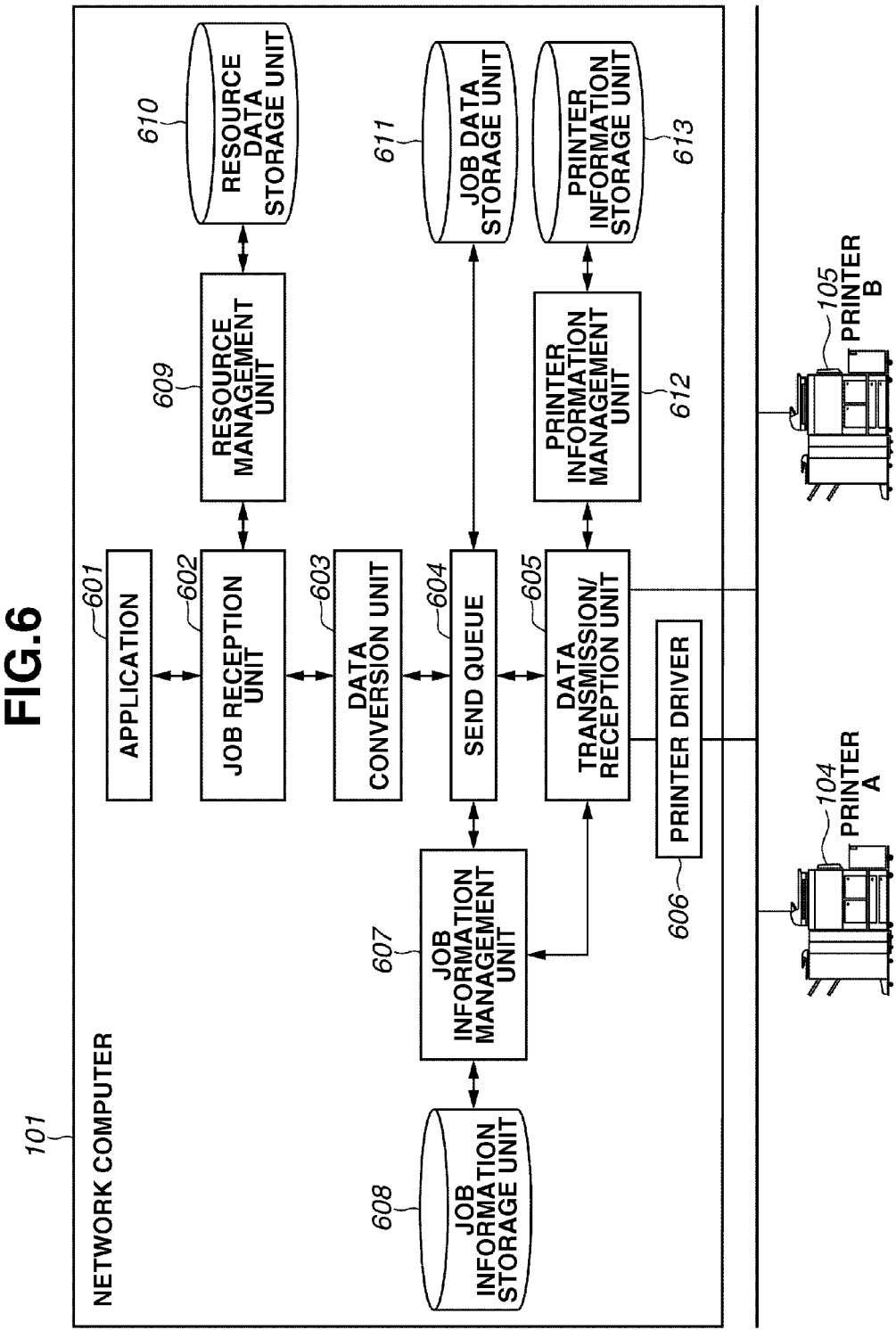
FIG. 6 illustrates an example of a software configuration of the information processing system according to the present exemplary embodiment.

FIG. 6 is a configuration diagram illustrating configurations of the information processing system for individual modules in the information processing apparatus according to the present exemplary embodiment. Each module has a function for implementing each unit in the claims of the present subject matter and configured to execute the processing in FIG. 12 and FIG. 14.

Figure 7:
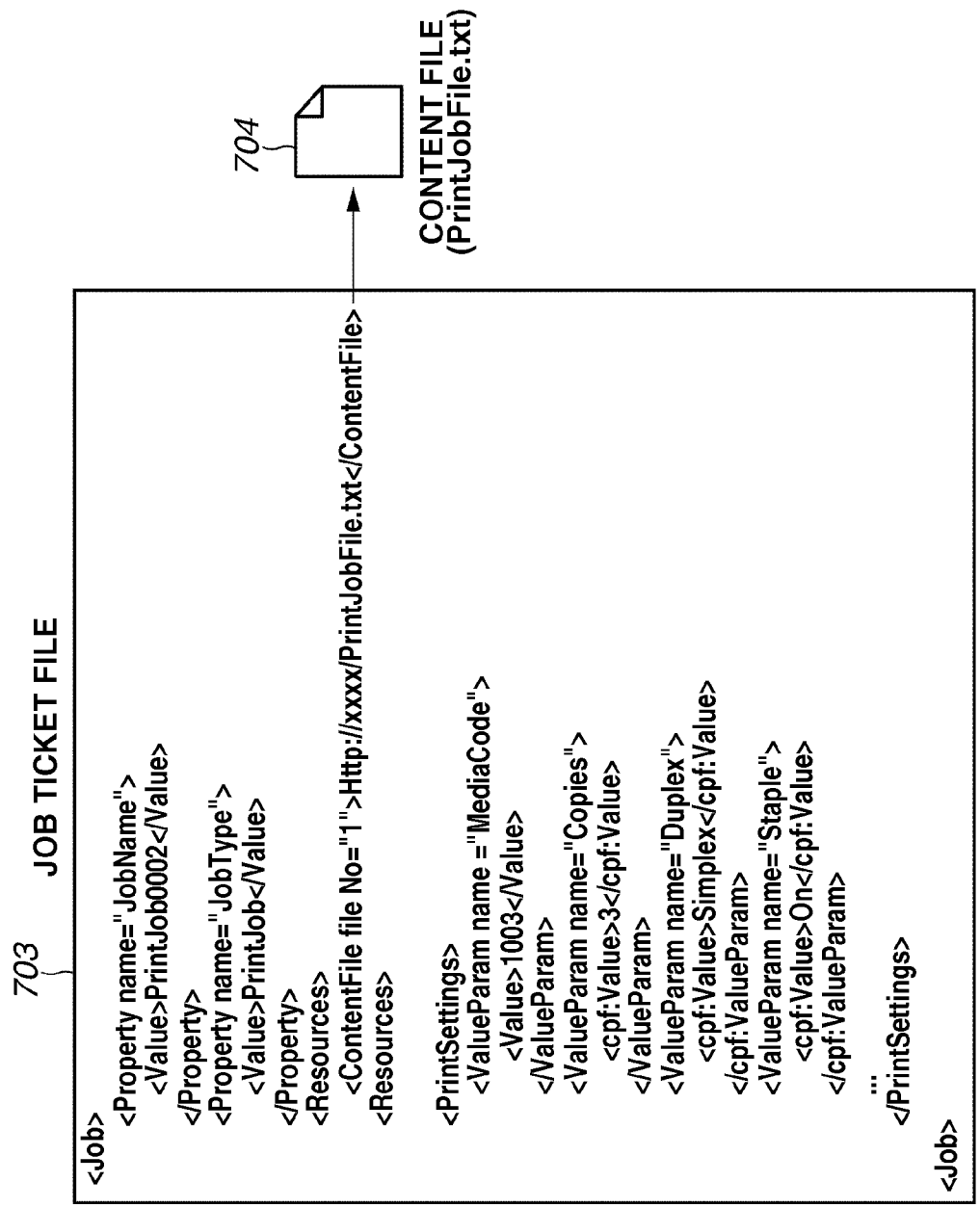
FIGS. 7A and 7B illustrate formats of resource data (resource object) and print data according to the present exemplary embodiment.

An application 601 generates print data as illustrated in FIG. 7A, for example, for performing printing with the printer 104 or 105 and sends the print data to the information processing system. The print data includes a content file including a job ticket file defining print setting information and image data to be printed. The application 601 has a function to send resource data illustrated in FIG. 7B to the information processing system. The resource data includes a job ticket file defining resource setting information and a resource file for setting the resource setting contents (for example, paper information) to the printer 104 or 105. A job reception unit 602 receives print data and resource data from the application 601. The job reception unit 602 also receives, from the application 601, an operation instruction to job data located in the computer 101, 102, or 103, or the printer 104 or 105. The operation instructions to the job data include a skip printing instruction and a canceling instruction. The skip printing is a function of skipping preceding job data to perform printing in such a manner that the printing of a job is to be performed next to a job currently being output. The canceling is a function of stopping (deleting the job data) the processing of specified job data. The operation instructions to the job data are not limited to these instructions, and the other operation instructions, e.g., an instruction for stopping the processing and an instruction for resuming the processing can be issued. A data conversion unit 603 converts print data or resource data received from the application 602 into job data of a format the printer 104 and 105 can receive as illustrated in FIGS. 9A and 9B. A send queue 604 controls a transmission order for sending a resource registration job and a print job to the printers 104 and 105. The send queue 604, based on a job information list 1000 managed by a job information management unit 607 illustrated in FIG. 10 and described below, selects job data from a job data storage unit 611 (described below), and sequentially sends the job data to a data transmission/reception unit 605 (described below). The data transmission/reception unit (data transmission unit) 605 sends the job data received from the send queue 604 via a printer driver 606 (described below), and communicates with the printers 104 and 105 to acquire status information or the like. The printer driver 606 sends the job data for printing received from the information processing system to the printers 104 and 105. A job information management unit 607 manages information of job data to be sent to the printers 104 and 105 according to an instruction of the send queue 604. The job information management unit 607 generates a job information list 1000 illustrated in FIG. 10, and stores the list in a job information storage unit 608 (described below). The job information storage unit 608 stores the job information list 1000 illustrated in FIG. 10. A resource management unit 609 manages resource data received from the application 601, and generates and manages a resource data information list 800 illustrated in FIG. 8. The content of the resource data information list 800 managed by the resource data management unit 609 is shared with the application 601. The application 601 uses the information in generating print data (for example, a resource data ID is specified for a content of print settings of print data). A resource data storage unit 610 stores the resource data and the resource data information list 800 illustrated in FIG. 8. A job data storage unit 611 stores job data generated by the data conversion unit 603. A printer information management unit 612 manages a status acquired from the printers 104 and 105 by the data transmission/reception unit 605 as a status list illustrated in FIG. 11. The printer information storage unit 612 stores a status list illustrated in FIG. 11. Functions of the control unit according to the present exemplary embodiment can be implemented with the send queue 604, the data transmission/reception unit 605, and the job information management unit 607.

<Example Resource Data and Print Data According to the Present Exemplary Embodiment>

FIGS. 7A and 7B illustrate examples of the resource data and the format of the print data to be received from the application 601 by the job reception unit 602 in the information processing system according to the present exemplary embodiment. FIG. 7A illustrates the resource data. The resource data includes a job ticket file 701 indicating the information of the resource data, and a resource file 702 indicating a content of the resource data. The job ticket file 701 includes link information indicating the path to the resource file. The resource file 702 includes resource information to be registered in printers. In the example in FIG. 7A, the resource file 702 includes parameters of paper information to be registered in the printer 104 or 105. FIG. 7B illustrates print data. The print data includes a job ticket file 703 indicating information of print data and a content file 704 containing page data (e.g., image data and character data) to be printed. The job ticket file 703 includes link information indicating the path to the content file, and print setting information (e.g., the number of sheets to be printed, an output sheet, one-sided/two-sided, and finishing settings). A content file 704 is page data of a target to be printed generated by the application 601. In the present exemplary embodiment, the content file 704 is described as text-based data, however, the data format can be an image file, and the format is not limited.

<Example Resource Data Information According to the Present Exemplary Embodiment>

FIG. 8 illustrates an example of the resource data information list 800 stored in the resource data storage unit 610 in the information processing system according to the present exemplary embodiment. The resource data information list 800 is, in the present exemplary embodiment, generated based on resource data received from the application 601, and the data in the list is shared with the application 601. In the present exemplary embodiment, paper information is described as an example of the resource data. A media code 801 is provided to uniquely identify output paper information (resource data). The media code 801 is assigned by the information processing system to resource data received from the application. The media code 801 is specified as print setting information in the print data generated by the application 601. A paper size 802, a paper name 803, a grammage 804, a surface property 805, and a color 806 are parameters of the paper, and respectively indicate a paper size, a paper name, grammage, a surface property, and a color. To the value of each parameter, a value specified in the resource file 702 in the resource data has been set. The types of the parameters are not limited to those values, and other parameters may be employed.

<Example Job Data According to the Present Exemplary Embodiment>

FIGS. 9A and 9B illustrate, in the information processing system according to the present exemplary embodiment, examples of formats of job data 901 and 902 generated by the data conversion unit 603. In FIG. 9A, the job data 901 illustrates a format of the job data for resource registration (hereinafter, referred to as resource job data) that can be received in the printer 104 or 105. In the present exemplary embodiment, a case of registering paper information as a resource is described. Further, in the present exemplary embodiment, it is assumed that the printer 104 or 105 can receive the resource data using a web service (not illustrated) on the printer, and the job data 901 is formed in a format (extensible markup language (XML) format) that can be received on the web service. In FIG. 9B, the job data 902 includes data necessary for performing printing in the printer 104 or 105 (hereinafter, referred to as print job data). Header information 903 includes information necessary for sending print job data to the printer 104 or 105 and information of the job data to be sent. Output setting information 904 includes output settings for issuing an instruction to the printer 104 or 105. The output setting information is generated from the print setting information specified by the job ticket file 703 in the print data. That is, the print settings include, for example, the number of sheets to be printed, an output sheet (the media code 801), one-sided/two-sided, and finishing settings. Output data 905 includes drawing information of output data to be drawn by the printer 104 or 105. The formats of the job data 901 and 902 are not limited to the above-described formats. Alternatively, any format capable of identifying the resource information, and identifying the print setting information of the print data of a target to be printed and the drawing information can be used.

<Example Job Information List According to the Present Exemplary Embodiment>

FIG. 10 illustrates an example of a job information list 1000 stored in the job information storage unit 608 in the information processing system according to the present exemplary embodiment. In the present exemplary embodiment, the job information list 1000 is generated based on the job data generated by the data conversion unit 603. In the present exemplary embodiment, paper information is described as an example of the resource data. A job name 1001 an identifier indicating the job name of job data. The job name 1001 is specified from the application 601 to the job ticket file 701 or 703. A job ID 1002 is issued by the information processing system to uniquely identify a job in the information processing system. A type 1003 is an identifier indicating the type of job data. The type 1003 indicates whether the target job data is print job data or resource job data (job data for paper registration). The type 1003 is specified from the application 601 to the job ticket file 701 or 703. A media job 1004 is an attribute to which a job ID of resource job data necessary for outputting target job data is set in the print job data. This attribute is set by the data conversion unit 603 by notifying the print setting (the media code 801) specified to the job ticket in the print data to the job information management unit 607 via the send queue 604. With this attribute, the print job data and the resource job data can be associated with each other. A wait flag 1005 indicates to wait for the transmission processing of the resource job data or the print job data to the printer 104 or 105. The wait flag 1005 is set by the send queue 604 by notifying the job information management unit 607 depending on the contents in the printer information list (1100 and 1107) managed by the printer information management unit 612. A skip flag 1006 indicates, in the print job data, that an instruction of the skip printing is issued. To the print job data to which the skip printing is instructed, this flag is set. A part of the information in the job information list 1000 is notified to the application 601, and the information is shared with the application 601. This enables the application 601 to issue an operation instruction to the job data, to the information processing system. That is, the application 601 specifies the job ID 1002 to issue an operation instruction of specific job data.

<Example Job Information List According to the Present Exemplary Embodiment>

FIGS. 11A and 11B illustrate examples of printer information lists 1100 and 1107 stored in the printer information storage unit 613 in the information processing system according to the present exemplary embodiment. In the present exemplary embodiment, the printer information lists 1100 and 1107 are generated based on the information acquired from the printers 104 and 105 with the data transmission/reception unit 605 for each printer and managed by the printer information management unit 612. The timing of the acquisition of the information by the data transmission/reception unit is, for example, polling for acquiring the information at regular intervals, an event for acquiring the information at a timing of status change, synchronous processing for acquiring the information according to an instruction from the application 601 or a module in the information processing system. In the present exemplary embodiment, the acquisition of paper information and a job status as the printer information from the printer A will be described as an example. The paper information list 1100 (FIG. 11A) indicates a list of paper information registered in the printer A. In the paper information list 1100 according to the present exemplary embodiment, 200 pieces of the paper information have been registered in the printer A. A printer 1101 (the printer A in the present exemplary embodiment) is an identifier indicating the printer 104 or 105 the paper information of which has been registered (an acquisition destination of the printer information). A paper type ID 1102 is an identifier for identifying the paper information registered in the printer A. This paper type ID 1102 is issued by the printers A and B. A paper name 1103, a grammage 1104, a surface property 1105, and a color 1106 are parameters indicating a paper name, grammage, a surface property, and a color of paper, respectively. A print job list 1107 (FIG. 11B) indicates a list of print jobs in a print queue (not illustrated) in the printer A. The job list 1107 is used to control the output order of the print jobs. This print job list indicates that there are five print jobs in the printer A, and from the top of the list, the print jobs are sequentially output (in the order of PrintJob1→PrintJob2 . . . →PrintJob5), and the print processing is executed in this order. A printer 1108 (the printer A in the present exemplary embodiment) is an identifier indicating the printer 104 or 105 the print job of which exists (an acquisition destination of the printer information). Job name 1109, job ID 1110, printer job ID 1111, and status 1112 are parameters indicating a job name, a job ID, a job ID in the printer, and a job status, respectively. The job ID 1110 is issued in the information processing system to uniquely identify a job in the information processing system. The job ID 1111 in the printer is issued by the printer 104 or 105. A part of the information in the printer information list 1100 is notified to the application 601, and the information is shared with the application 601. This enables the application 601, to issue an operation instruction to the job in the printer 104 or 105, to the information processing system. Thus, the application 601 specifies the job ID 1110 to issue an operation instruction of specific job data in the printer 104 or 105.

<Processing Sequence in Printing in Information Processing System According to the Present Exemplary Embodiment>

Figure 12:
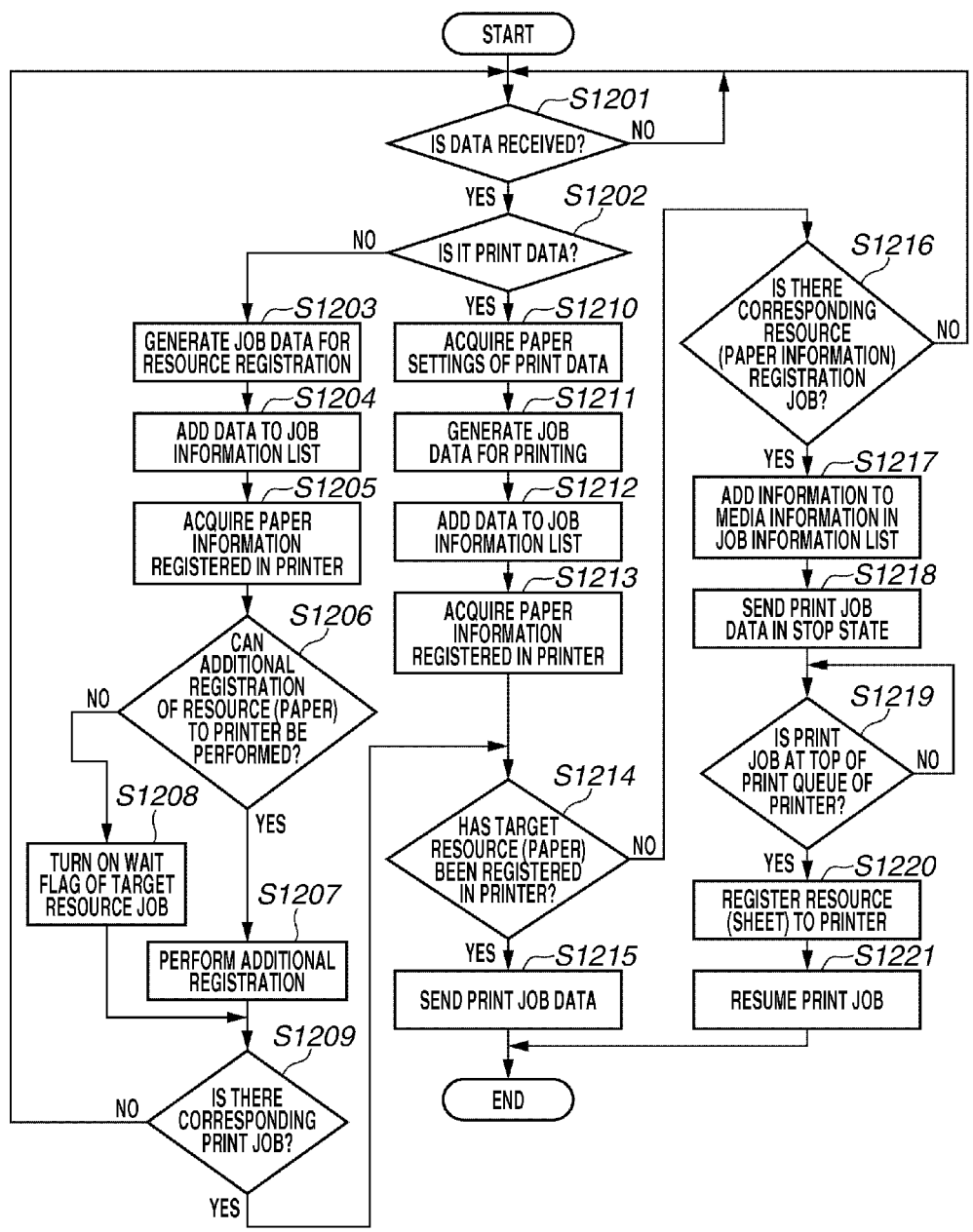
FIG. 12 is a flowchart illustrating job data transfer processing in the information processing system according to the present exemplary embodiment.

FIG. 12 illustrates, in the information processing system according to the present exemplary embodiment, a flow of processing from receiving print data from the application 601 to transmitting job data to the printer 104 or 105. A program relating to each flow is stored in the hard disks 205 in the computers 101, 102, and 103, read into the RAMs 202, and executed by the CPUs 200, respectively. In this sequence, transmission of job data from the computer 101 to the printer A is described as an example. Further, it is assumed that the resource data to be registered in the printer A is paper information.

In step S1201, the job reception unit 602 determines whether the job reception unit 602 has received data (print data or resource data) from the application 601. If the data has been received (YES in step S1201), the processing proceeds to step S1202. In step S1202, the job reception unit 602 determines whether the data received in step S1201 is print data. If the received data is the print data (YES in step S1202), the processing proceeds to step S1210. If the received data is not the print data (if the received data is the resource data) (NO in step S1202), the processing proceeds to step S1203. In step S1203, the data conversion unit 603 converts the resource data (701 and 702) into resource job data (901). The data conversion unit 603 transfers the converted resource job data to the send queue 604. In step S1204, the job information management unit 607 adds the target resource job data to the job information list 1000 stored in the job information storage unit 608 in response to the instruction of the send queue 604. In step S1205, the data transmission/reception unit 605 acquires the list of the paper information registered in the printer A, and the printer information management unit 612 generates the paper information list 1100 to store the list in the printer information storage unit 613. In step S1206, the send queue 604 determines whether the send queue 604 can add and register the resource (paper information) to the printer A. If the resource can be added and registered (YES in step S1206), the processing proceeds to step S1207. If the resource cannot be added and registered (NO in step S1206), the processing proceeds to step S1208. For example, in the paper information list 1100 in FIG. 11A, 200 pieces of the paper information have been registered in the printer A. If the upper limit of the number of pieces of the paper information that can be registered in the printer A is 200, it is not possible to add and register the resource (NO in step S1206), and then, the processing proceeds to step S1208. In step S1207, the send queue 604 sends the resource job data to the printer A via the data transmission/reception unit 605 to register the resource (paper information). In step S1208, the job information management unit 607, in response to the instruction of the send queue 604, sets to ON the wait flag 1005 of the target resource job data in the job information list 1000 stored in the job information storage unit 608. In step S1209, the send queue 604 determines whether the job information list 1000 includes print job data (using the target paper) corresponding to the target resource job data. If the list 1000 includes the print job data (YES in step S1209), the processing proceeds to step S1214. If the list 1000 does not include the print job data (NO in step S1209), the processing proceeds to step S1201.

In step S1210, the data conversion unit 603 acquires setting information of the output paper from the job ticket file (703) of the print data. In the example illustrated in FIG. 7B, as the media code, "1003" has been specified, and the content (the value of the parameter) can be identified from the resource data information list 800. The data conversion unit 603 notifies the send queue 604 of the acquired setting information. In step S1211, the data conversion unit 603 converts the print data (703 and 704) into print job data (902). The data conversion unit 603 transfers the converted print job data to the send queue 604. In step S1212, the job information management unit 607 adds the target print job data to the job information list 1000 stored in the job information storage unit 608 in response to the instruction of the send queue 604. In step S1213, the data transmission/reception unit 605 acquires the list of the paper information registered in the printer A, and the printer information management unit 612 generates the paper information list 1100 to store the list in the printer information storage unit 613. In step S1214, the send queue 604 determines whether the resource (paper information) acquired in step S1210 has been registered in the resource (paper information) registered in the printer A. If the resource has been registered (YES in step S1214), the processing proceeds to step S1215. If the resource has not been registered (NO in step S1214), the processing proceeds to step S1216. In step S1215, the send queue 604 sends the print job data to the printer A via the data transmission/reception unit 605 and the printer driver 606.

In step S1216, the send queue 604 determines whether the job information list 1000 includes the resource job data (the job data for paper information registration) acquired in step S1210. If the job information list 1000 includes the resource job data (YES in step S1216), the processing proceeds to step S1217. If the job information list 1000 does not include the resource job data (NO in step S1216), the processing proceeds to step S1201. In step S1217, the job information management unit 607, in response to the instruction of the send queue 604, sets the job ID of the resource job data found in step S1216 to a value of the media job 1004 in the job information list 1000 stored in the job information storage unit 608. In step S1218, the send queue 604 sends the print job data in a stop state (so that the job data becomes in a stop state with a print queue (not illustrated) for sequentially processing the job data in the printer A) to the printer A via the data transmission/reception unit 605 and the printer driver 606. The instruction for stopping the job in the printer A may be set in the header information 903 in the job data 902, or another instruction may be issued to the printer A for instruction. In step S1209, the send queue 604 determines whether the target print job data in the print job list 1107 in the printer information storage unit 613 is at the top of the print queue in the printer A. In other words, the send queue 604 determines whether the target print job data has arrived at the top of the print job list 1107. If the print job data is at the top of the print job list 1107 (YES in step S1219), the processing proceeds to step S1220. If the print job data is not at the top of the print job list 1107 (NO in step S1219), the processing proceeds to step S1219. In step S1220, the send queue 604 sends the resource job data corresponding to the target print job data to the printer A via the data transmission/reception unit 605 to register the resource (paper information) to the printer A. In step S1221, the send queue 604, sends an instruction for releasing the stop state of the target print job data to the printer A via the data transmission/reception unit 605.

The above-described steps enables the information processing system according to the present exemplary embodiment to reflect the resource data specified to the print data to the printer A at an appropriate timing. Consequently, in the printer A, an appropriate output product can be obtained.

<Print Processing Sequence in Printing in the Information Processing System According to the Present Exemplary Embodiment>

Figure 13:
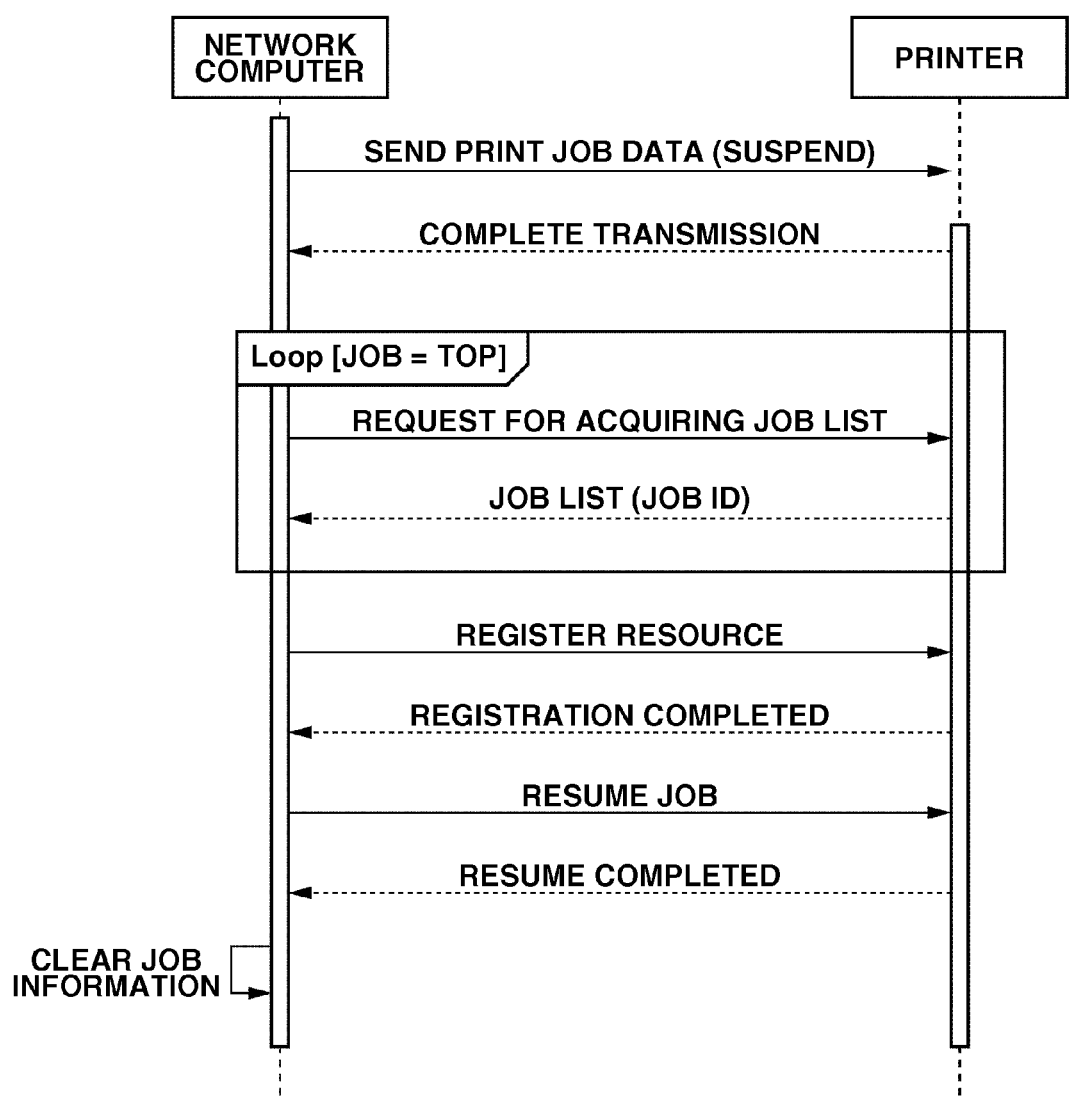
FIG. 13 is a sequence diagram illustrating communication processing between the information processing system according to the present exemplary embodiment and the printer 104 or the printer 105 in transferring job data.

FIG. 13 illustrates, in the information processing system according to the present exemplary embodiment, as illustrated in step S1210 to step S1214 in FIG. 12, the flow of the information exchange for sending the print job data and the resource job data through the communication of the send queue 604 with the printer 104 or 105 via the data transmission/reception unit 605. In this sequence, exchange of information between the computer 101 and the printer A is described as an example. Further, it is assumed that the resource data to be registered in the printer A is paper information. The send queue 604 in the computer 101 transfers the print job data in a suspended state to the printer A. The send queue 604 acquires the list information of the print job data in the printer A from the data transmission/reception unit 605 in the computer 101, and updates the print job list 1107 (in FIG. 13, a case of polling is illustrated). The send queue 604 in the computer 101 determines whether the sent print job data has arrived at the top of the print job list 1107. If the job data has arrived at the top, the send queue 604 transfers the resource job data for paper registration to the printer A via the data transmission/reception unit 605. The send queue 604 in the computer 101, when the registration of the resource data is completed, releases the stop state of the sent print job data via the data transmission/reception unit 605. The send queue 604 in the computer 101, upon completion of the release of the stop state, deletes the target print job data and the resource job data from the job information list 1000.

<Processing Sequence in Job Operation in the Information Processing System According to the Present Exemplary Embodiment>

Figure 14:
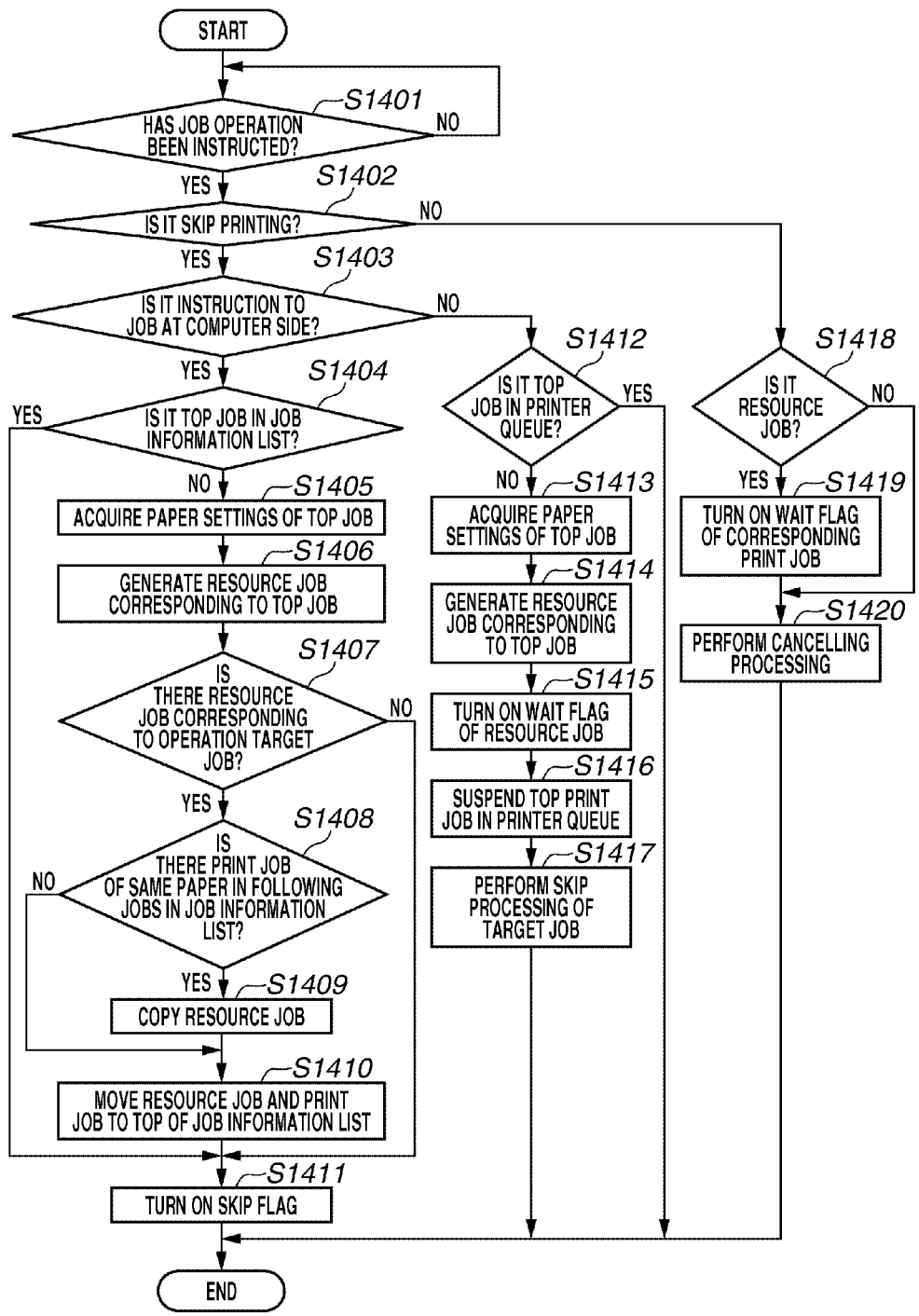
FIG. 14 is a flowchart illustrating job data operation processing in the information processing system according to the present exemplary embodiment.

FIG. 14 illustrates, in the information processing system according to the present exemplary embodiment, in response to an instruction from the application 601, in the computer 101, 102, or 103, and the printer 104 or 105, a flow of processing for performing skip printing to the print job data, and performing an operation for canceling (suspending the job) the print job data or the resource job data. Programs relating to the flow are stored in the hard disks 205 in the computers 101, 102, and 103, read in the RAMs 202, and executed by the CPUs 200, respectively. In the sequence, an operation to the job data in the computer 101 and the printer A is described as an example. Further, it is assumed that the resource data to be registered in the printer A is paper information.

In step S1401, the job reception unit 602 determines whether the job reception unit 602 has received a job operation instruction from the application 601. If the operation instruction has been received (YES in step S1401), the processing proceeds to step S1402. In step S1402, the job reception unit 602 determines whether the type of the operation received in step S1401 is skip printing. If the type of the operation is skip printing (YES in step S1402), the processing proceeds to step S1403. If the type of the operation is not skip printing (i.e., if the type of the operation is cancel) (NO in step S1402), the processing proceeds to step S1418. In step S1403, the job reception unit 602 refers to the job information list 1000 and the printer job list 1107 to determine whether the operation instruction from the application 601 is an instruction to the print job data in the computer 101. If the instruction is an instruction to the print job data in the computer 101 (YES in step S1403), the processing proceeds to step S1404. If the instruction is not an instruction to the print job data in the computer 101 (i.e., if the instruction is an instruction to the print job data in the printer) (NO in step S1403), the processing proceeds to step S1412.

In step S1404, the send queue 604, in response to the instruction from the job reception unit 602, determines whether the print job data to be operated is at the top of the job information list 1000 (top job). If the print job data is at the top of the list (YES in step S1404), the processing proceeds to step S1411. If the print job data is not at the top of the list (NO in step S1404), the processing proceeds to step S1405. In step S1405, the send queue 604 acquires the content of the resource (paper) settings in the top job in the job information list 1000 in the computer 101. In step S1406, the send queue 604 generates resource job data corresponding to the top job in the job information list 1000 in the computer 101 (adds the data to the job information list 1000). In step S1407, the send queue 604 determines whether the job information list 1000 includes the resource job data corresponding to the operation target print job data. If the list 1000 includes the resource job data (YES in step S1407), the processing proceeds to step S1408. If the list 1000 does not include the resource job data (NO in step S1407), the processing proceeds to step S1411. In step S1408, the send queue 604, in the job information list 1000, determines whether there is print job data that uses the same resource (paper) in the subsequent data of the operation target print job data. If the list 1000 includes the print job data (YES in step S1408), the processing proceeds to step S1409. If the list 1000 does not include the print job data (NO in step S1408), the processing proceeds to step S1410. In step S1409, the send queue 604 copies the resource job data corresponding to the operation target print job data (copies the resource job data in the job information list 1000). In step S1410, the send queue 604 moves the resource job data and the print job data to the top of the job information list 1000. In step S1411, the job information management unit 607, in response to the instruction of the send queue 604, set to ON the skip flag 1006 in the job information list 1000.

In step S1412, the send queue 604 determines, in response to the instruction from the job reception unit 602, whether the operation target job is the print job data (top job) at the top and in a wait state (i.e., the next job of the print job data in printing) in the print queue in the printer A. If the operation target job is the top job (YES in step S1412), the processing ends without performing any processing since the job is the top job, it is not necessary to perform the skip printing. If the operation target job is not the top job (NO in step S1412), the processing proceeds to step S1413. In step S1413, the send queue 604 acquires the content of the resource (paper) settings in the top job in the print queue in the printer A via the data transmission/reception unit 605. In step S1414, the send queue 604 generates, in the computer 101, the resource job data corresponding to the top job in the print queue in the printer A (i.e., adds the data to the job information list 1000). In step S1415, the job information management unit 707, in response to the instruction of the send queue 604, set to ON the wait flag 1005 of the resource job data generated in step S1414 in the job information list 1000 stored in the job information storage unit 608. In step S1416, the send queue 604 instructs the top job in the print queue in the printer A to be suspended via the data transmission/reception unit 605. In step S1417, the send queue 604 instructs the operation target job data in the print queue in the printer A to skip the job via the data transmission/reception unit 605.

In step S1418, the job reception unit 602 determines whether the operation (cancel) target job data is the resource job data. If the operation target data is the resource job data (YES in step S1418), the processing proceeds to step S1419. If the operation target data is not the resource job data (i.e., if the operation target data is print job data) (NO in step S1418), the processing proceeds to step S1420. In step S1419, the send queue 604, in response to the instruction from the job reception unit 602, set to ON the wait flag 1005 of the print job data corresponding to the target resource job data in the job information list 1000 stored in the job information storage unit 608. In step S1420, the send queue 604 performs canceling processing on the operation target job data.

The above-described steps enables the information processing system according to the present exemplary embodiment to obtain an appropriate output product in the printer A even if, for example, the order of the job data is changed by an operation instruction from the application 601.

According to the present exemplary embodiment of the present subject matter, to the printing control apparatus for outputting print job using resource data, the resource data can be registered at an appropriate timing.

Other Embodiments

Embodiments of the present subject matter can also be realized by a computer of a system or apparatus that reads out and executes computer executable instructions recorded on a storage medium (e.g., non-transitory computer-readable storage medium) to perform the functions of one or more of the above-described embodiment(s) of the present subject matter, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present subject matter has been described with reference to exemplary embodiments, it is to be understood that the subject matter is not limited to the disclosed exemplary embodiments. The scope of the following claims is to be accorded the broadest interpretation so as to encompass all such modifications and equivalent structures and functions.

This application claims the benefit of Japanese Patent Application No. 2013-018597 filed Feb. 1, 2013, which is hereby incorporated by reference herein in its entirety.

What is claimed is:

1. An information processing apparatus configured to be connected to a printing control apparatus that is configured to sequentially output print jobs according to a print queue for controlling a print job output order, the information processing apparatus comprising:
   a data transmission unit configured to transmit, to the printing control apparatus, a resource registration job for registering a resource in a printing control apparatus, and a print job, the resource registration job comprising resource data to be registered at the printing control apparatus, the resource data required for outputting the print job;
   a determination unit configured to determine whether the resource data can be added to and registered in the printing control apparatus given conditions at the printing control apparatus; and
   a control unit configured to control the data transmission unit and the printing control apparatus,
   wherein, in a case where the determination unit has determined that the resource data cannot be added to and registered in the printing control apparatus given the conditions at the printing control apparatus,
   the control unit controls the data transmission unit to hold the resource registration job in the information processing apparatus,
   transmit to the printing control apparatus the print job without the resource registration job, wherein the print job is transmitted in a stopped state, the stopped state causing the printing control apparatus to hold off on outputting the print job, and
   transmit to the printing control apparatus the resource registration job held in the information processing apparatus when the print job arrives at the top of the print queue of the printing control apparatus, and
   in the case where the determination unit has determined that the resource data cannot be added to and registered in the printing control apparatus given the conditions at the printing control apparatus, then after the resource data is registered at the printing control apparatus based on the resource registration job, the control unit controls the printing control apparatus to start outputting the print job, which has been stopped by the printing control apparatus.

2. The information processing apparatus according to claim 1, wherein the control unit includes a send queue for controlling an order of sending the resource registration job and the print job, and sequentially sends the resource registration job and the print job to the printing control apparatus according to the send queue.

3. The information processing apparatus according to claim 2, wherein the control unit, in a case where the order of the print jobs in the send queue or the print queue is changed, changes the order of the resource registration jobs in the send queue.

4. The information processing apparatus according to claim 3, wherein the control unit, in the case where the order of the print jobs in the send queue or the print queue is changed, copies the resource registration job in the send queue.

5. The information processing apparatus according to claim 1, wherein the resource data is information about output paper.

6. An information processing system including the information processing apparatus and the printing control apparatus according to claim 1.

7. An information processing method for an information processing apparatus connected to a printing control apparatus configured to sequentially output print jobs according to a print queue for controlling a print job output order, the information processing apparatus having a data transmission unit configured to transmit to the printing control apparatus a resource registration job for registering a resource in the printing control apparatus, and a print job, wherein the resource registration job comprises resource data to be registered at the printing control apparatus, the resource data required for outputting the print job, the information processing method comprising:
   determining whether the resource data can be added to and registered in the printing control apparatus given conditions at the printing control apparatus;
   controlling the data transmission unit, in a case where the determination unit has determined that the resource data cannot be added to and registered in the printing control apparatus given the conditions at the printing control apparatus, to
   hold the resource registration job in the information processing apparatus,
   transmit to the printing control apparatus the print job, without the resource registration job, wherein the print job is transmitted in a stopped state, the stopped state causing the printing control apparatus to hold off on outputting the print job, and
   transmit to the printing control apparatus the resource registration job held in the information processing apparatus when the print job arrives at the top of the print queue; and
   in a case where the determination unit has determined that the resource data cannot be added to and registered in the printing control apparatus given the conditions at the printing control apparatus, then after the resource data is registered at the printing control apparatus based on the resource registration job, controlling the printing control apparatus to start outputting the print job, which has been stopped by the printing control apparatus.

8. A non-transitory storage medium storing a program for causing a computer to execute the information processing method according to claim 7.

* * * * *